United States Patent Office 3,476,203
Patented Nov. 4, 1969

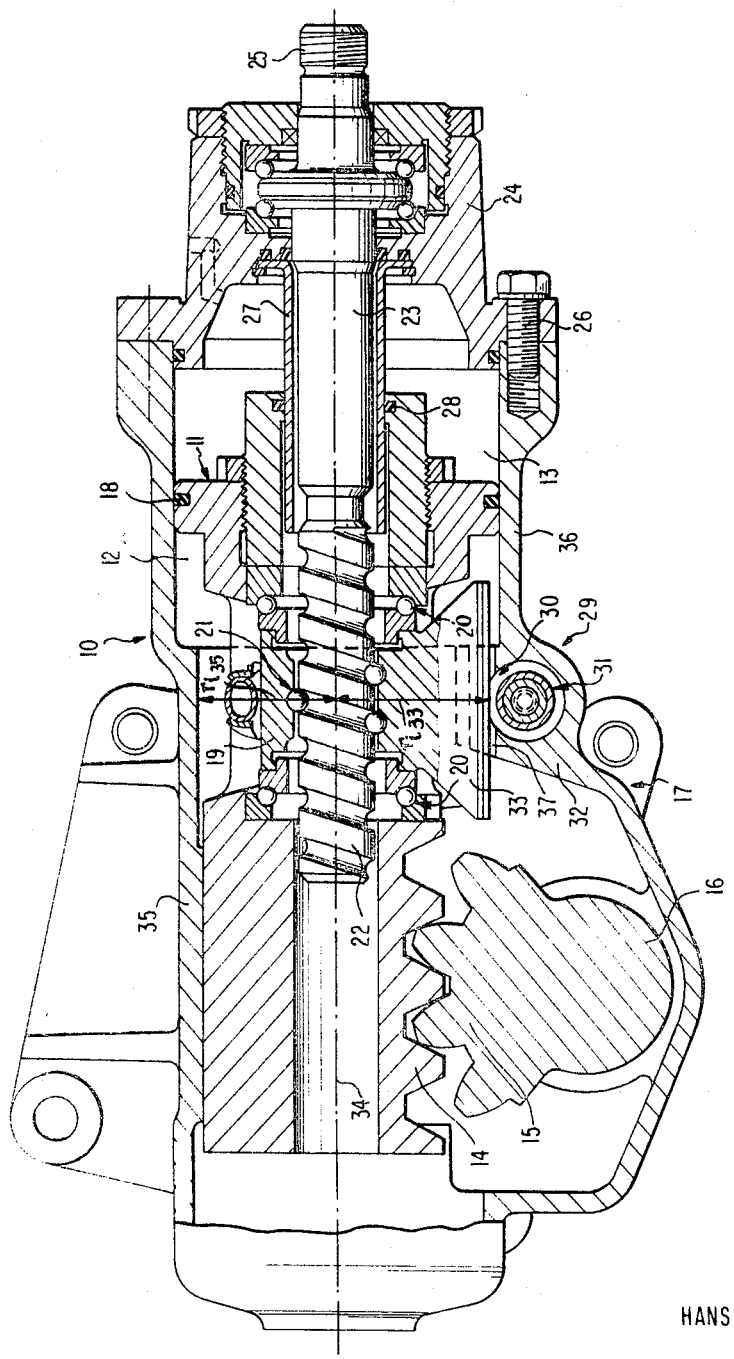

3,476,203
SERVO-STEERING SYSTEM FOR MOTOR
VEHICLES
Hans-Joachim M. Förster, Stuttgart-Riedenberg, and
Klaus Katz, Stuttgart, Germany, assignors to
Daimler-Benz Aktiengesellschaft, Stuttgart-Unter-
turkheim, Germany
Filed Apr. 6, 1967, Ser. No. 629,015
Claims priority, application Germany, Apr. 9, 1966,
D 49,836
Int. Cl. B62d 5/00; F15b 21/02
U.S. Cl. 180—79.2                              14 Claims

ABSTRACT OF THE DISCLOSURE

A servo-steering mechanism for motor vehicles which comprises a housing for the steering gear constructed as pressure medium cylinder, a working piston slidingly arranged in the housing and subdividing the housing into working spaces, the pressure medium cylinder having in relation to its diameter a wider cylinder portion for the working spaces and a narrower cylinder portion for the guidance of the working piston, a control valve mounted in the housing of the narrow cylinder portion which controls by the movements of its valve body the pressure medium for the working spaces, the valve body being connected with a member of the steering gear transmitting the steering movements of the steering spindle to the steering shaft, and the steering shaft being also rotatably supported in the narrower cylinder portion of the housing. Preferably the valve body as well as the steering spindle are arranged on the same side of a plane containing the cylinder axis.

BACKGROUND OF THE INVENTION

The present invention relates to a servo-steering system for motor vehicles in which the housing of the steering gear is constructed as pressure medium cylinder whose working piston is operatively connected with an output steering shaft of the steering gear and whose working spaces are connected with a control valve whose movable valve body controlling the pressure medium of the working spaces is operatively connected in a motion-dependent manner with a member of the steering gear interconnected in the steering movement transmission of the input steering spindle to the steering shaft, and in which the steering shaft, the control valve, and the steering spindle are rotatably supported in the housing of the steering gear.

SUMMARY OF THE INVENTION

The purpose underlying the present invention essentially resides in improving such known servo-steering mechanisms. For this purpose, provision is made according to the present invention that the pressure medium cylinder includes in relation to its diameter a relatively wide cylinder portion for the working spaces and a relatively narrow cylinder portion for the guidance of the working piston and that both the steering shaft as well as also the movable valve body are supported in the housing of the narrower cylinder portion. A part of the movable valve body may project into the interior space of the narrow cylinder portion. Advantageously, abutments may be provided in the latter for a member of the steering gear operatively connected in a motion-dependent manner with the movable valve body. It is furthermore possible that the steering shaft and movable valve body are arranged on the same side of a plane containing the steering spindle axis or the cylinder axis.

The housing convexity or bulge or the steering shaft may accommodate at least partially one or several connecting means between the valve body and transmission members of the steering gear. The steering shaft and movable valve body, however, may also be arranged in a common housing bulge of the narrower cylinder portion.

Considerable advantages are achieved by the present invention.

The radial dimensions of the housing are limited to a minimum which is determined by the piston force to be applied. A narrower cylinder portion is used for the guidance of the working piston so that also by this measure a saving in weight can be achieved. By the arrangement of the valve body in the housing walls of the narrower cylinder portion, there is achieved in addition to the compact construction that a portion of the valve body may project into the cylinder interior space. A direct connection between the control valve and at least one of the working spaces is possible thereby. Also, the construction and arrangement of the control mechanism for the movable valve body is improved by the present invention. The control member of the steering gear operatively connected in a motion-dependent manner with this valve body may engage with that part of the valve body which projects into the cylinder interior space. Abutments may be created readily in an improved manner by the reduced inner diameter of the cylinder for the control member connected with the movable valve body in that, for example, radial grooves or the like are provided in the narrowed inner wall. The effective lever arm or the control member may be thereby constructed also larger than would be permitted normally by the guide diameter of the pressure medium cylinder. By the arrangement of the steering shaft and movable valve body on the same housing side the structural dimensions are reduced while the housing convexity for the bearing support of the steering shaft is reinforced nonetheless. The structural length of the transmission housing can be considerably reduced because with this arrangement, one or several connecting means between the movable valve body and transmission members of the steering gear—especially the control member engaging at the valve body—may extend or protrude in the housing convexity or bulge of the steering shaft. Steering shaft and movable valve body are accommodated in the smallest space by the common housing bulge.

Accordingly, it is an object of the present invention to provide a servo-steering mechanism for motor vehicles which avoids by simple means the aforementioned shortcomings and drawbacks encountered by the prior art constructions.

Another object of the present invention resides in a servo-steering mechanism for motor vehicles in which the radial dimensions of the housing are reduced to a minimum while at the same time considerable savings in weight are achieved. A further object of the present invention resides in an arrangement of a servo-steering mechanism of the type described above in which a direct connection between the control valve and at least one of the working spaces is possible thereby also improving the construction and arrangement of the control mechanism for the movable valve body.

Still another object of the present invention resides in a servo-steering mechanism for motor vehicles in which the effective lever arm of the control member may be effectively larger than would normally be permissive as governed by the diametric dimensions of the cylinder.

These and other objects, features, and advantages of the present invention will become more obvious from the following description when taken in connection with the accompanying drawing which shows, for purposes of illustration only, one embodiment in accordance with the present invention, and wherein:

The single figure is a longitudinal axial cross-sectional view to the housing of a steering gear with servo-assist in accordance with the present invention.

Referring now to the single figure of the drawing, reference numeral 10 designates therein the housing of the steering gear which is constructed as pressure medium cylinder and which includes a narrower cylinder portion 35, smaller in the diametric dimension thereof, for the guidance of the working piston generally designated by reference numeral 11 and a wider cylinder portion 36, enlarged in the diametric dimension thereof, for the working spaces 12 and 13. The working piston 11 is provided with a toothed rack profile 14 which is in meshing engagement with the toothed segment 15 of a gear output steering shaft 16.

The steering shaft 16 is rotatably supported in a housing bulge or convexity 17 of the narrower cylinder portion 35. The working piston 11 is sealed by means of a radially outer seal 18 with respect to the housing 10 and is operatively connected with a steering nut 19 in such a manner as to be rotatable but axially non-displaceable relative thereto. The steering nut 19 is thereby supported in the working piston 11 by way of inclined ball bearings 20.

The steering nut 19 is connected for relative helical movement with a steering worm 22 by way of a conventional ball circulation system generally designated by reference numeral 21 which may be of any conventional construction. The steering worm 22 includes a gear input spindle part 23 which is rotatably but axially non-displaceably supported in a housing cover 24. The steering spindle 23 is provided with an external connecting piece 25 for the non-rotatable connection with the steering wheel of the motor vehicle.

The housing cover 24 is secured at the housing 10 by screws 26 and seals the same against the outside in a pressure and fluid-tight manner. A guide bushing or sleeve 27 at the bearing cover 24 which is concentric to the steering spindle 23, is sealed with respect to the working piston 11 by a radially inner seal 28.

The supply and return of the pressure medium to the working spaces 12 and 13 takes place in dependence of the control valve generally designated by reference numeral 29 which is arranged together with the steering shaft 16 on the same side of the plane perpendicular to the drawing plane and extending through the longitudinal axis 34 of the steering spindle 23 or of the housing 10. The steering shaft 16 and the movable control slide valve member 31 of the valve 29 are arranged parallel to one another in the common housing bulge 17 and are spatially separated from each other by a common wall part 32.

The control slide valve member 31 is in operative engagement with a radial arm 33 of the steering nut 19 in such a manner that angular deflections of the steering nut 19 about the axis 34 which are closely limited with respect to the housing 10, are transmitted into rectilinear movements of the control slide valve member 31 perpendicularly to the plane of the drawing.

Since the steering nut 19 is axially non-displaceably supported in the working piston 11 and partakes in the stroke movements thereof, the radial arm 33, for the continuous engagement with the control slide valve member 31, has the shape of a bar or ruler. This ruler may project at least partially into the adjacent housing bulge 17 of the steering shaft 16 so that the structural length of the housing 10 is reduced.

An axial groove 37 is accommodaed in the narrowed cylinder portion 35 within the area of the control slide member 31 which groove is constructed of U-shape in cross section and limits the angular movement of the radial arm 33. In relation to the cylinder axis 34, the radial length $r_t33$ of the arm 33 is larger than the inner radius $r_t35$ of the narrower cylinder portion 35.

The control slide valve member 31 projects with a part 30 of its cross section into the interior space of the narrower cylinder portion 35 so that the control valve 29 may be provided with a direct connection to the working space 12.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A servo-steering mechanism for motor vehicles in which the housing of the steering gear is constructed as pressure medium cylinder, whose working piston is operatively connected with a steering gear output shaft and whose working spaces are connected with a control valve having a movable valve body controlling the pressure medium, said valve body being operatively connected with a transmission member of the steering gear connected in the power train of the steering movement from the steering spindle to said steering shaft, wherein the improvement comprises in the axial direction of pressure medium cylinder, a relatively wider external cylinder portion in said pressure medium cylinder for the working spaces and a relatively narrower external cylinder portion in said pressure medium cylinder for the guidance of said working piston along the internal walls thereof, and both said steering shaft as well as said movable valve body being supported in the housing of the narrower cylinder portion non-concentrically to the steering spindle and outside of the latter.

2. A servo-steering mechanism according to claim 1, wherein a portion of the movable valve body projects into the interior space of the narrower cylinder portion so that the control valve may be provided with a direct connection to one of the working spaces.

3. A servo-steering mechanism according to claim 2, wherein the narrower cylinder portion is provided with internal abutment means for a member of the steering gear operatively connected with said movable valve body to limit the movements of said last-mentioned member of the steering gear.

4. A servo-steering mechanism according to claim 3, wherein said steering shaft and said movable valve body are arranged on the same side of a plane containing the cylinder axis and extending approximately parallel to the axis of said valve body.

5. A servo-steering mechanism according to claim 4, further comprising connecting means between said valve body and a transmission member of the steering gear transmitting the steering movement, said connecting means projecting at least partially into the housing bulge for the steering shaft.

6. A servo-steering mechanism according to claim 5, wherein said steering shaft and said movable valve body are arranged in a common housing bulge of the narrower cylinder portion.

7. A servo-steering mechanism according to claim 2, further comprising connecting means between said valve body and a transmission member of the steering gear transmitting the steering movement, said connecting means projecting at least partially into the housing bulge for the steering shaft.

8. A servo-steering mechanism according to claim 2, wherein said steering shaft and said movable valve body are arranged on the same side of a plane containing the cylinder axis and extending approximately parallel to the axis of said valve body.

9. A servo-steering mechanism according to claim 8, wherein said steering shaft and said movable valve body are arranged in a common housing bulge of the narrower cylinder portion.

10. A servo-steering mechanism according to claim 1, wherein the narrower cylinder portion is provided with internal abutment means for a member of the steering gear operatively connected with said movable valve body to limit the movements of said last-mentioned member of the steering gear.

11. A servo-steering mechanism according to claim 1, further comprising connecting means between said valve body and a transmission member of the steering gear transmitting the steering movement, said connecting means projecting at least partially into a housing bulge for the steering shaft.

12. A servo-steering mechanism according to claim 1, wherein said steering shaft and said movable valve body are arranged on the same side of a plane containing the cylinder axis and extending approximately parallel to the axis of said valve body.

13. A servo-steering mechanism according to claim 1, wherein said steering shaft and said movable valve body are arranged in a common housing bulge of the narrower cylinder portion.

14. A servo-steering mechanism according to claim 13, wherein a portion of the movable valve body projects into the interior space of the narrower cylinder portion so that the control valve may be provided with a direct connection with one of the working spaces.

References Cited
UNITED STATES PATENTS

| | | | |
|---|---|---|---|
| 3,010,436 | 11/1961 | Folkerts | 180—79.2 X |
| 3,070,072 | 12/1962 | Folkerts | 180—79.2 X |

FOREIGN PATENTS

| | | |
|---|---|---|
| 811,980 | 4/1959 | Great Britain. |
| 1,152,623 | 8/1963 | Germany. |

LEO FRIAGLIA, Primary Examiner

JOHN A. PEKAR, Assistant Examiner

U.S. Cl. X.R.

91—380